(No Model.)
R. VARLEY, Jr.
LIMITING STOP FOR ARMATURES.
No. 476,845. Patented June 14, 1892.
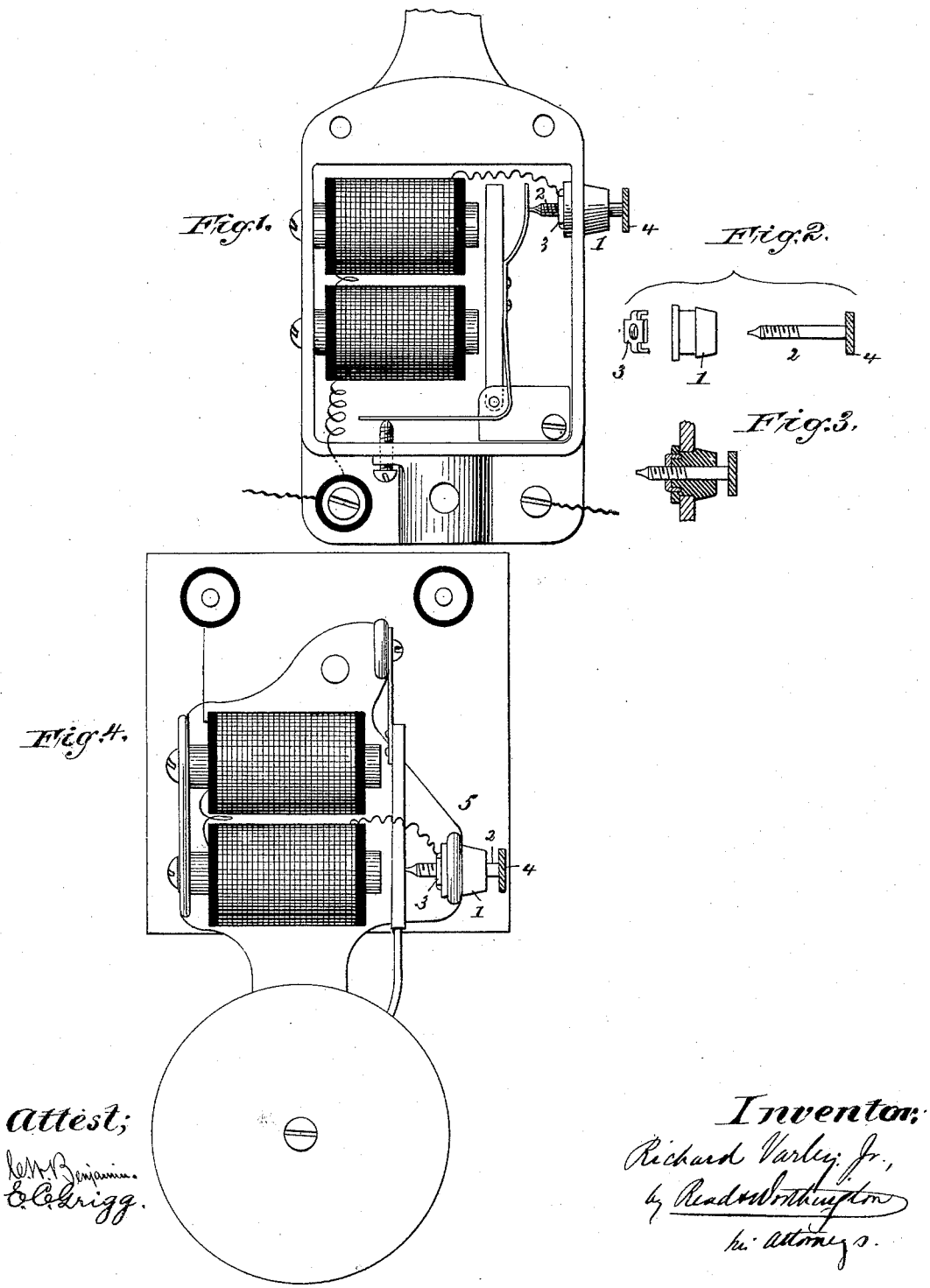
Attest;
W.H.Benjamin.
E.C.Grigg.
Inventor:
Richard Varley, Jr.,
by Read&Worthington
his attorneys.

UNITED STATES PATENT OFFICE.

RICHARD VARLEY, JR., OF ENGLEWOOD, NEW JERSEY.

LIMITING-STOP FOR ARMATURES.

SPECIFICATION forming part of Letters Patent No. 476,845, dated June 14, 1892.

Application filed July 27, 1891. Serial No. 400,837. (No model.)

*To all whom it may concern:*

Be it known that I, RICHARD VARLEY, Jr., a citizen of the United States, residing at Englewood, in the county of Bergen and State of New Jersey, have invented certain new and useful Improvements in Limiting-Stops for Armatures; and I do hereby declare the following to be a full, clear, and exact description of the invention, such as will enable others skilled in the art to which it appertains to make and use the same.

This invention relates to electric bells or other devices in which an arm vibrating or oscillating against a limiting-stop is used, and in which there is a tendency in the repeated strokes of the vibrating arm against the stop to loosen it and change its position of adjustment.

The object of the invention is to lock the limiting-stop in a simpler manner than has heretofore been done and to guard against its working loose by the repeated shocks to which it is subjected.

To this end the invention consists in mounting the stop in a fixed compressible bushing or sleeve which will tightly grip it and permit adjustment by the application of great pressure and prevent looseness by its compression upon the stop.

The invention more specifically comprises a bushing or sleeve of soft rubber mounted upon a suitable support through which an adjusting-screw extends, the walls of the opening being compressed against the surface of the adjusting-screw, so as to firmly grip it.

In the accompanying drawings, which illustrate this invention, Figure 1 is an elevation of a buzzer or automatic vibrator provided with one of my limiting-stops. Fig. 2 is a detail view of the several parts of the stop. Fig. 3 is a sectional view showing the parts assembled. Fig. 4 is an elevation of a rheotomic bell provided with one of my stops.

I provide a compressible bushing or sleeve 1, preferably made of an elastic compressible material, such as soft rubber, though leather or similar compressible material not having a high degree of elasticity or even an inelastic material which is thoroughly compressible might be used and would fall within the scope of my invention. This bushing is preferably made, as shown in the drawings, with two flanges at its ends, the outer one of which tapers, as illustrated, so that when the screw 2 is inserted through its central opening and the nut 3 is placed upon the screw the whole may be drawn through or pressed into an opening or recess in a supporting-frame until the walls of the opening enter the space between the two flanges, which then lock the bushing firmly in position. The central part or stem of the bushing is preferably made slightly larger than the opening in the support, so that the bushing will be held under compression when it is in its proper position.

With a view to facilitating the mounting of the parts when assembled in an aperture through the frame of a bell or other device the head of the screw 4 is made sufficiently small to be drawn through the opening which is to support the bushing, so that when the parts are assembled in the relation shown in Fig. 3 the head of the screw may be thrust through the opening, a pair of pliers applied, and the whole forcibly drawn forward until the bushing is sprung into its final position.

While I have shown and described the bushing as provided with flanges, such a structure is not absolutely essential, and I do not desire to limit my invention thereto, as I have found that a simple cylindrical or tubular bushing of other shape or one having a taper will yield good results and will prevent loosening of the adjusting-screw. The inner end of the bushing is recessed, so that it will accommodate the projecting tangs of the nut 3, and in mounting the device these tangs should be forced into the openings before the bushing is drawn into place. The compression forces the wall of the circular recess into tight engagement with the bushing and causes the latter to firmly grip the stem of the screw, and the latter is effectually prevented from working loose and yet is capable of convenient adjustment, so as to regulate the contact by applying considerable force to its adjusting tip or button.

The device may be applied to any electrical device in which under the influence of vibratory or repeated contact an adjusting-screw is liable to work loose—as, for example, in buzzers, bells, sounders, keys, relays, or the like.

In Fig. 1 I have shown the device as applied to a buzzer in which a contact enters from the outside of the box containing the vibratory mechanism, a form of frame largely in commercial use both for bells and buzzers. In Fig. 4 another form of frame is shown in which the mechanism is exposed, the adjusting-screw being mounted in a lug or support 5, cast integral with the base-plate. It will thus be seen that the contact is not only perfectly insulated, but is firmly locked and free from derangement under continued use, and that these results are attained by a very simple and cheap construction.

Having thus described my invention, what I claim as new, and desire to secure by Letters Patent, is—

1. A limiting-stop for an electric device, comprising a stop or stud and a compressible sleeve of elastic material in which the stop is locked by compression of the sleeve.

2. A limiting-stop for an electric vibrator or the like, comprising a fixed elastic bushing and a stop or stud locked therein by the elastic pressure of the bushing.

3. A limiting-stop for a vibrating armature or the like, comprising a fixed soft-rubber bushing and an adjusting-screw supported under compression in the bushing.

4. A limiting-stop for a vibrating armature or the like, comprising a fixed compressible bushing, an adjusting-screw held by the elastic pressure of the bushing, and a nut engaging the screw, said nut being held from turning relatively to the bushing.

5. A limiting-stop for a vibrating armature or the like, comprising an elastic bushing and an adjusting-screw supported therein and held firmly by the elastic pressure of the bushing.

6. A limiting-stop for a vibrating armature or the like, comprising an elastic bushing tapered for convenient insertion in an opening through a fixed support, an adjusting-screw within the bushing, and a nut engaging the screw, said nut being adapted to lock against the bushing to prevent turning.

7. A limiting-stop for a vibrating bell or the like, comprising a soft-rubber bushing and an adjusting-screw within the bushing, the head of the screw being less in diameter than the bushing, whereby the whole may be conveniently forced into an opening through a fixed support.

In testimony whereof I affix my signature in presence of two witnesses.

RICHARD VARLEY, JR.

Witnesses:
E. C. GRIGG,
VICTOR E. BURKE.